United States Patent
Lindel et al.

(10) Patent No.: US 9,982,932 B2
(45) Date of Patent: May 29, 2018

(54) REFRIGERATION APPLIANCE WITH AN ICE CONTAINER

(71) Applicant: BSH Hausgeraete GmbH, Munich (DE)

(72) Inventors: Andreas Lindel, Heidenheim (DE); Karl-Friedrich Laible, Langenau (DE); Thomas Bischofberger, Kisslegg (DE); Felix Wiedenmann, Heidenheim (DE)

(73) Assignee: BSH Hausgeraete GmbH, Munich (DE)

( * ) Notice: Subject to any disclaimer, the term of this patent is extended or adjusted under 35 U.S.C. 154(b) by 177 days.

(21) Appl. No.: 14/886,255

(22) Filed: Oct. 19, 2015

(65) Prior Publication Data

US 2017/0074574 A1 Mar. 16, 2017

(30) Foreign Application Priority Data

Sep. 15, 2015 (DE) .................. 10 2015 217 566

(51) Int. Cl.
| | |
|---|---|
| *F25D 11/00* | (2006.01) |
| *F25C 5/18* | (2018.01) |
| *F25D 11/02* | (2006.01) |
| *F25D 17/06* | (2006.01) |
| *F25D 23/00* | (2006.01) |
| *F25D 25/00* | (2006.01) |
| *F25D 23/06* | (2006.01) |

(52) U.S. Cl.
CPC .............. *F25C 5/182* (2013.01); *F25D 11/02* (2013.01); *F25D 17/065* (2013.01); *F25D 23/006* (2013.01); *F25D 23/062* (2013.01); *F25D 25/005* (2013.01); *F25D 2201/124* (2013.01); *F25D 2201/14* (2013.01); *F25D 2317/061* (2013.01); *Y02B 40/34* (2013.01)

(58) Field of Classification Search
CPC ...... F25D 11/02; F25D 17/065; F25D 23/006; F25D 25/005; F25D 2317/061
See application file for complete search history.

(56) References Cited

U.S. PATENT DOCUMENTS

| | | | |
|---|---|---|---|
| 7,228,703 B2* | 6/2007 | Kim ....................... | F25D 17/065 62/353 |
| 2006/0090496 A1* | 5/2006 | Adamski ................. | F25C 5/005 62/344 |
| 2013/0105494 A1* | 5/2013 | Jung ..................... | F25D 23/062 220/592.05 |
| 2013/0200771 A1 | 8/2013 | Coulter et al. | |

(Continued)

*Primary Examiner* — Elizabeth Martin
(74) *Attorney, Agent, or Firm* — Laurence A. Greenberg; Werner H. Stemer; Ralph E. Locher (57) ABSTRACT

A refrigeration appliance has a refrigerator compartment container and an ice container for providing ice. The refrigerator compartment container delimits a refrigerator compartment. A receiving niche for receiving the ice container is formed in an exterior of the refrigerator compartment container. The receiving niche has an opening to the refrigerator compartment, wherein an opening of the ice container and the opening of the receiving niche are aligned flush with one another. The ice container has a container outer wall, a container inner wall and a thermal insulation, which is arranged between the container inner wall and the container outer wall.

15 Claims, 4 Drawing Sheets

(56) References Cited

U.S. PATENT DOCUMENTS

| | | | |
|---|---|---|---|
| 2013/0263620 A1* | 10/2013 | An | F25D 23/064 62/340 |
| 2014/0260407 A1* | 9/2014 | Boehringer | F25C 5/005 62/344 |
| 2016/0370102 A1* | 12/2016 | Yang | F25D 23/08 |

* cited by examiner

REFRIGERATION APPLIANCE WITH AN ICE CONTAINER

BACKGROUND OF THE INVENTION

Field of the Invention

The present invention relates to a refrigeration appliance with an ice container.

Conventional refrigeration appliances often have ice containers for providing ice. The ice provided by the ice container can be used by the user of the refrigeration appliance to cool a beverage for instance. The cooling zone of a refrigeration appliance is delimited by a refrigerator compartment container. An ice container is usually arranged in the cooling zone of the refrigeration appliance. One area of the wall of the refrigerator compartment container is usually an integral part of the exterior of the ice container.

US 2013/0200771 A1 discloses a refrigeration appliance with an ice making area, wherein the ice making area is arranged in the cooling zone of the refrigeration appliance. During the manufacturing process of the refrigeration appliance, the ice making area is formed integrally with the container of the cooling zone of the refrigeration appliance.

BRIEF SUMMARY OF THE INVENTION

The object of the present invention is to specify a refrigeration appliance with an ice container for providing ice, which has an advantageous thermal insulation.

This object is achieved by a subject matter having the features as claimed in the independent claim. Advantageous embodiments form the subject matter of the dependent claims, the description and the drawings.

According to one aspect, the inventive object is achieved by a refrigeration appliance having a refrigerator compartment container and an ice container for providing ice, wherein the refrigerator compartment container delimits a refrigerator compartment, wherein a receiving niche for receiving the ice container is formed in an exterior of the refrigerator compartment container, wherein the receiving niche has an opening toward the refrigerator compartment, and wherein the ice container has a container outer wall, a container inner wall and a thermal insulation, which is arranged between the container inner wall and the container outer wall.

As a result, the technical advantage is achieved for instance in that an effective thermal insulation of the ice container is achieved by means of the thermal insulation, as a result of which ice provided by the ice container can be stored for longer in the ice container. Moreover, the user of the refrigeration appliance can remove ice provided by the ice container from the ice container through the opening of the receiving niche to the refrigerator compartment, as a result of which a particularly advantageous and simple removal of ice from the ice container is enabled by the refrigerator compartment.

The refrigerator compartment is delimited by the refrigerator compartment container, wherein the refrigerator compartment is delimited in particular by an interior of the refrigerator compartment container. A receiving niche for receiving the ice container is formed in the exterior of the refrigerator compartment container, said receiving niche being embodied to receive the ice container. As a result, the ice container can be fastened to the exterior of the refrigerator compartment container to the receiving niche. The ice container is thus not arranged in the refrigerator compartment, as a result of which the useful volume in the refrigerator compartment is not reduced. During assembly of the refrigeration appliance, insulation material, such as e.g. insulation foam, is introduced between the exterior of the refrigerator compartment container and an outer casing. Since the ice container is attached to the exterior of the refrigerator compartment container, the ice container is surrounded by the insulation material, as a result of which in addition to the thermal insulation a particularly effective thermal insulation of the ice container is ensured.

To ensure that ice can be removed from the refrigerator compartment out of the ice container by the user of the refrigeration appliance when the refrigeration appliance door is open, a connector must be established between the exterior of the refrigerator compartment container and the refrigerator compartment. The receiving niche has an opening to the refrigerator compartment, as a result of which a connector between the exterior of the refrigerator compartment container and the refrigerator compartment can be established. As a result when the refrigeration appliance door is open, the user of the refrigeration appliance can remove ice from the refrigerator compartment out of the ice container, wherein the ice container is however not arranged in the refrigeration appliance interior but instead on the exterior of the refrigerator compartment container.

Cooling energy can be advantageously supplied to the ice container by positioning the ice container on the exterior of the refrigerator compartment container. Moreover, no gap is produced between the exterior of the refrigerator compartment container and the ice container by receiving the ice container on the receiving niche of the refrigerator compartment container, as a result of which an advantageous tight connection is ensured between the two component parts. Moreover, a particularly effective thermal insulation of the ice container is achieved by the arrangement of the ice container on the exterior of the refrigerator compartment and the thermal insulation in the ice container, as a result of which ice provided by the ice container can be kept in the ice container for longer.

A refrigeration appliance is understood in particular to mean a domestic refrigeration appliance, in other words a refrigeration appliance which is used for managing the household or in the field of gastronomy, and serves in particular to store groceries and/or beverages at certain temperatures, like for instance a refrigerator, a freezer, a fridge/freezer combination, a chest freezer or a wine chiller.

In an advantageous embodiment of the refrigeration appliance, the ice container comprises an opening, wherein the opening of the ice container and the opening of the receiving niche are aligned flush with one another.

As a result, the technical advantage is achieved for instance in that a particularly tight arrangement of the ice container on the exterior of the refrigerator compartment container is enabled by the flush alignment of the opening of the ice container and the opening of the receiving niche and cooling energy is prevented from escaping from the refrigerator compartment. The user of the refrigeration appliance can thus remove ice from the refrigerator compartment out of the ice container when the refrigeration appliance door is open.

In an advantageous embodiment of the refrigeration appliance, the thermal insulation comprises a thermal insulation plate or a thermal insulation fibrous layer.

As a result, the technical advantage is achieved for instance in that a particularly effective thermal insulation of the ice container is ensured by using a thermal insulation plate or a thermal insulation fibrous layer. A particularly advantageous thermal insulation is ensured by the thermal insulation plate or thermal insulation fibrous layer, which is arranged between the container outer wall and the container inner wall. The thermal insulation plate or thermal insulation fibrous layer may have a small size, as a result of which the space requirement of the thermal insulation in the ice container is reduced, as a result of which the container interior of the ice container which is available is in turn enlarged. The thermal insulation fibrous layer can in particular comprise a knitted, woven, braided or interlaced textile fiber.

In an advantageous embodiment of the refrigeration appliance, the thermal insulation plate comprises a plate exterior and a plate interior, which delimit a plate intermediate space, wherein the plate intermediate space contains vacuum, air or insulation gas.

As a result, the technical advantage is achieved for instance in that the use of vacuum, air or insulation gas in the plate intermediate space can achieve a particularly operative and effective thermal insulation of the thermal insulation plate, since the heat exchange through the plate intermediate space is reduced particularly effectively.

In an advantageous embodiment of the refrigeration appliance, the receiving niche is arranged laterally on the exterior of the refrigerator compartment container.

As a result, the technical advantage is achieved for instance in that the lateral arrangement of the receiving niche on the exterior of the refrigerator compartment container is suited particularly advantageously to receiving the ice container. With a lateral arrangement of the receiving niche, the ice container is in contact with a side wall of the refrigerator compartment container. Since the ice container is received in the receiving niche, the lateral arrangement of the receiving niche allows for a connection between the ice container and the refrigerator compartment, by means of which the user of the refrigeration appliance has access to the ice container from the refrigerator compartment.

In an advantageous embodiment of the refrigeration appliance, the receiving niche is embodied as a deformation of the exterior of the refrigerator compartment container.

As a result, the technical advantage is achieved for instance in that on account of the deformation of the exterior of the refrigerator compartment container, the receiving niche can be embodied during manufacture of the refrigerator compartment container such that an effective receiving of the ice container is enabled. The user thus gains access to the ice container from the refrigerator compartment. A specific molding of the receiving niche which is dependent on the form of the refrigerator compartment container and on the form of the ice container can thus be achieved on account of the deformation of the exterior of the refrigerator compartment container.

In an advantageous embodiment of the refrigeration appliance, the refrigeration appliance has a refrigeration appliance door on a front side of the refrigeration appliance, wherein the opening of the receiving niche points toward the refrigerator compartment and toward the refrigeration appliance door.

As a result, the technical advantage is achieved for instance in that when the refrigeration appliance door is open, the ice provided in the ice container is easily and advantageously accessible for the user of the refrigeration appliance from the front side of the refrigeration appliance. The opening of the receiving niche points toward the refrigerator compartment and the refrigeration appliance door, wherein the ice container is received in the receiving niche. The opening of the ice container thus also points toward the refrigerator compartment and toward the refrigeration appliance door and the ice container is thus advantageously accessible for the user from the refrigeration appliance door.

In a further advantageous embodiment of the refrigeration appliance, the ice container comprises a container cover, wherein the container cover is embodied to close the opening of the ice container, and wherein the container cover is in particular a container door.

As a result, the technical advantage is achieved in that an effective closing of the opening of the ice container effected by the container cover ensures an effective thermal insulation of the ice container. The container cover can be embodied in particular as a container door, by means of which the ice container can be closed. The container door can be opened in order to remove ice from the ice container.

In a further advantageous embodiment of the refrigeration appliance, the container inner wall has a peripheral groove for receiving the container cover.

As a result, the technical advantage is achieved in that a particularly advantageous reception of the container cover on the container inner wall is ensured by the peripheral groove on the container inner wall.

In a further advantageous embodiment, the ice container is connected to the receiving niche in a bonded, force-fit or form-fit manner, in particular bonded.

As a result, the technical advantage is achieved for instance in that a particularly effective fastening of the ice container on the receiving niche is enabled by the tight connection between the ice container and the receiving niche. A particularly stable fastening is ensured by the tight reception of the ice container in the receiving niche and there are in particular no gaps between the exterior of the refrigerator compartment container and the ice container.

In a further advantageous embodiment of the refrigeration appliance, the refrigeration appliance has an outer casing, wherein the outer casing delimits a housing intermediate space between the outer casing and the refrigerator compartment container, wherein the housing intermediate space contains an insulation material and wherein the insulation material is in particular polyurethane foam.

As a result, the technical advantage is achieved for instance in that a particularly effective thermal insulation of the refrigerator compartment container and the refrigerator compartment in respect of the outer region of the refrigeration appliance is ensured by the insulation material, in particular polyurethane foam. Since the ice container is attached to the exterior of the refrigerator compartment container, an effective insulation of the ice container is also ensured by the insulation material.

In a further advantageous embodiment of the refrigeration appliance, the refrigeration appliance comprises a housing seal, wherein the housing seal is arranged on the opening to the refrigerator compartment, in order to seal the opening to the refrigerator compartment in respect of the refrigerator compartment.

As a result, the technical advantage is achieved for instance in that a particularly advantageous thermal-insulating seal of the refrigerator compartment is ensured by the housing seal on the opening to the refrigerator compartment. Moreover, the housing seal prevents insulation material, such as e.g. polyurethane foam, from penetrating through the opening to the refrigerator compartment into the refrigerator compartment when the refrigeration appliance is filled with foam.

In a further advantageous embodiment of the refrigeration appliance, the refrigeration appliance comprises a refrigerant circuit with a refrigerant evaporator, wherein the refrigerant evaporator is connected in a thermally conducting manner to the ice container.

As a result, the technical advantage is achieved for instance in that an effective cooling of the ice container is enabled by the refrigerant evaporator. The refrigerant evaporator is a heat exchanger, in which the liquid refrigerant is evaporated by the thermal absorption of the medium to be cooled, e.g. the air surrounding the refrigerant evaporator. By means of the thermal output to the refrigerant, the surroundings of the refrigerant evaporator are cooled. If the refrigerant evaporator is connected in a thermally conducting manner to the ice container, this results in a thermal transfer from the ice container to the refrigerant evaporator, as a result of which the ice container is cooled.

In a further advantageous embodiment of the refrigeration appliance, the refrigerant evaporator is arranged on the ice container on the exterior of the refrigerator compartment container or is arranged in the ice container.

As a result, the technical advantage is achieved for instance in that a particularly effective cooling of the ice container is enabled by the arrangement of the refrigerant evaporator on the ice container on the exterior of the refrigerator compartment container or by the arrangement of the refrigerant evaporator in the ice container.

In a further advantageous embodiment of the refrigeration appliance, the refrigeration appliance has an air duct, which is arranged on the exterior of the refrigerator compartment container, and is embodied to connect the refrigerator compartment to the ice container.

As a result, the technical advantage is achieved for instance in that an effective guidance of cool air out of the refrigerator compartment to the ice container is ensured through the air duct, which connects the refrigerator compartment to the ice container. A particularly effective cooling of the ice container can be implemented by the air duct arranged on the exterior of the refrigerator compartment container.

In a further advantageous embodiment of the refrigeration appliance, the ice container comprises an electrically operable ice making facility, wherein the electrically operable ice making facility is connected to an electrical power supply of the refrigeration appliance by means of an electrical connection.

As a result, the technical advantage is achieved for instance in that an advantageous generation of ice is enabled by means of the electrically operable ice making facility in the ice container. The electrically operable ice making facility is connected with an electrical connection to the electrical power supply of the refrigeration appliance, in order to ensure an effective generation of ice in the container interior of the ice container.

BRIEF DESCRIPTION OF THE SEVERAL VIEWS OF THE DRAWING

Further exemplary embodiments are explained with reference to the appended drawings, in which.

DESCRIPTION OF THE INVENTION

Figure 1:
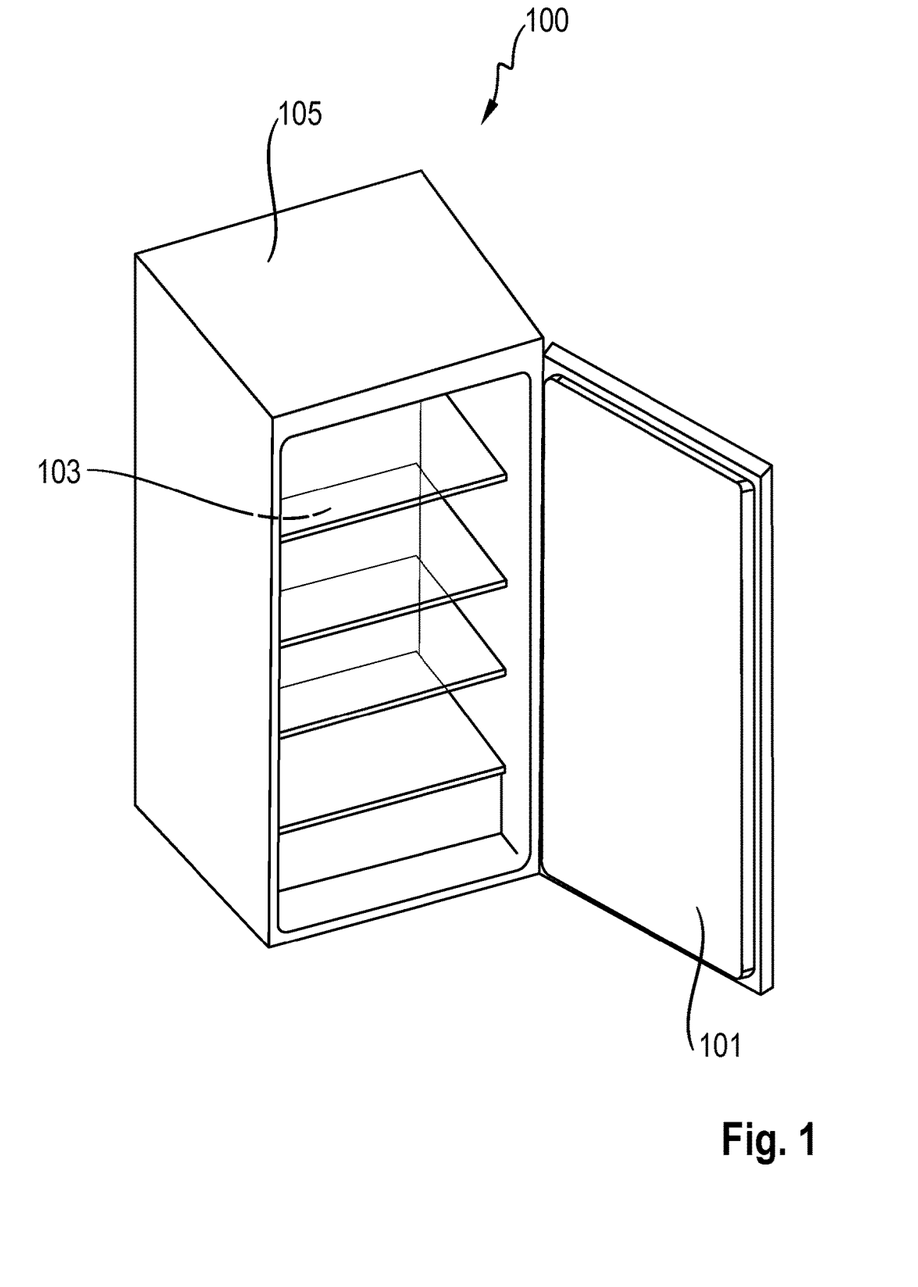
FIG. 1 shows a schematic representation of a refrigeration appliance.

FIG. 1 shows a refrigerator representative of a general refrigeration appliance 100 having a refrigeration appliance door 101, by means of which the refrigerator compartment 103 of the general refrigeration appliance 100 can be closed. The refrigeration appliance 100 is delimited by an outer casing 105. The refrigeration appliance 100 comprises one or a number of refrigerant circuits each with an evaporator, compressor, condenser and throttle. The evaporator is a heat exchanger, in which after expansion the liquid refrigerant is evaporated by thermal absorption from the medium to be cooled, e.g. air. The compressor is a mechanically operated component part, which takes in refrigerant steam from the evaporator and strikes the condenser at high pressure. The condenser is a heat exchanger, in which after compression the evaporated coolant is condensed by heat output to an outer cooling medium, e.g. air. The throttle is an apparatus for constantly reducing the pressure by means of cross-section reduction. The refrigerant is a fluid which is used to transfer heat in the refrigerant circuit, which at low temperatures and a low pressure of the fluid absorbs heat and at a higher temperature and a higher pressure of the fluid outputs heat, wherein status changes of the fluid are usually included.

Figure 2:
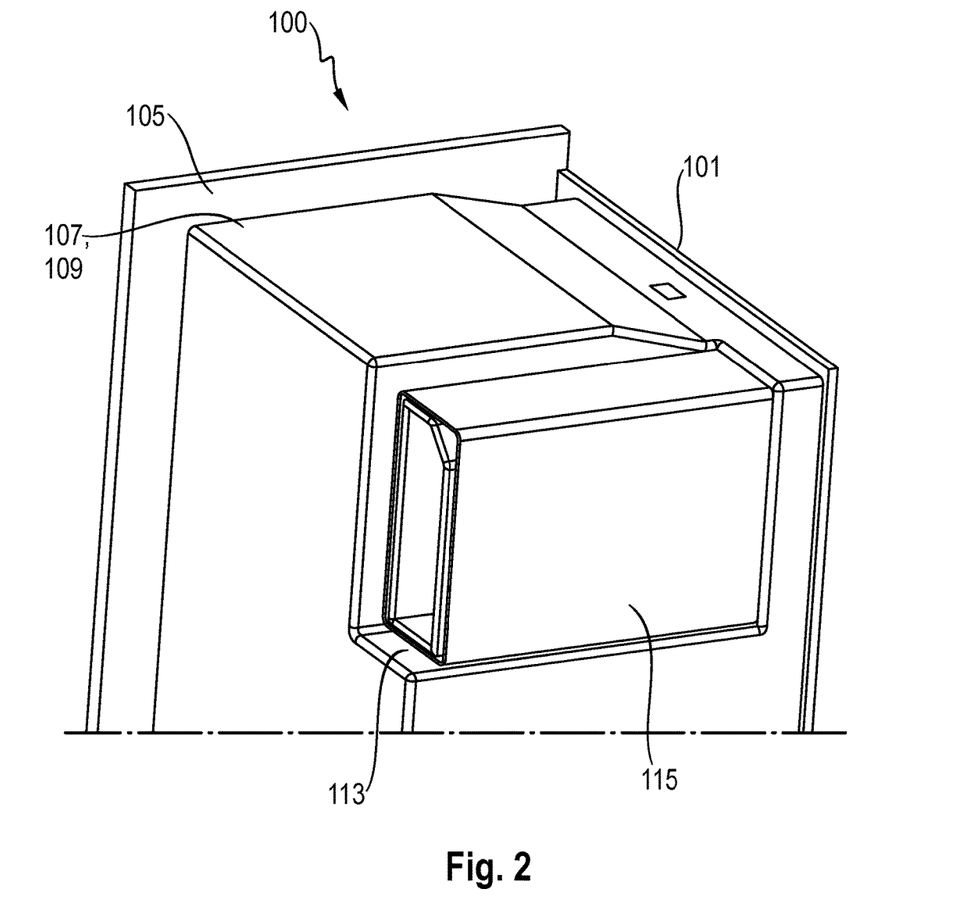
FIG. 2 shows a schematic representation of a refrigerator compartment container having an ice container.

FIG. 2 shows a schematic representation of a refrigerator compartment container having an ice container. FIG. 2 shows the refrigerator compartment container 107 of a refrigeration appliance 100 in the side view, wherein the outer casing 105 to a longitudinal side of the outer casing 105 is not shown in FIG. 2. The refrigeration appliance 100 also comprises a refrigeration appliance door 101, which is fastened to the refrigeration appliance 100 and is embodied to close the refrigerator compartment 103, wherein the refrigerator compartment 103 is not shown in FIG. 2. The refrigerator compartment container 107 comprises an exterior 109 of the refrigerator compartment container 107, which is shown in FIG. 2 and comprises an interior 111 of the refrigerator compartment 107 which delimits the refrigerator compartment 103 and is not shown in FIG. 2. The refrigerator compartment container 107 comprises a receiving niche 113, which is arranged laterally on the exterior 109 of the refrigerator compartment container 107. An ice container 115 is received by the receiving niche 113, which can be connected to the receiving niche 113 in a bonded, form-fit or force-fit manner.

Figure 3:
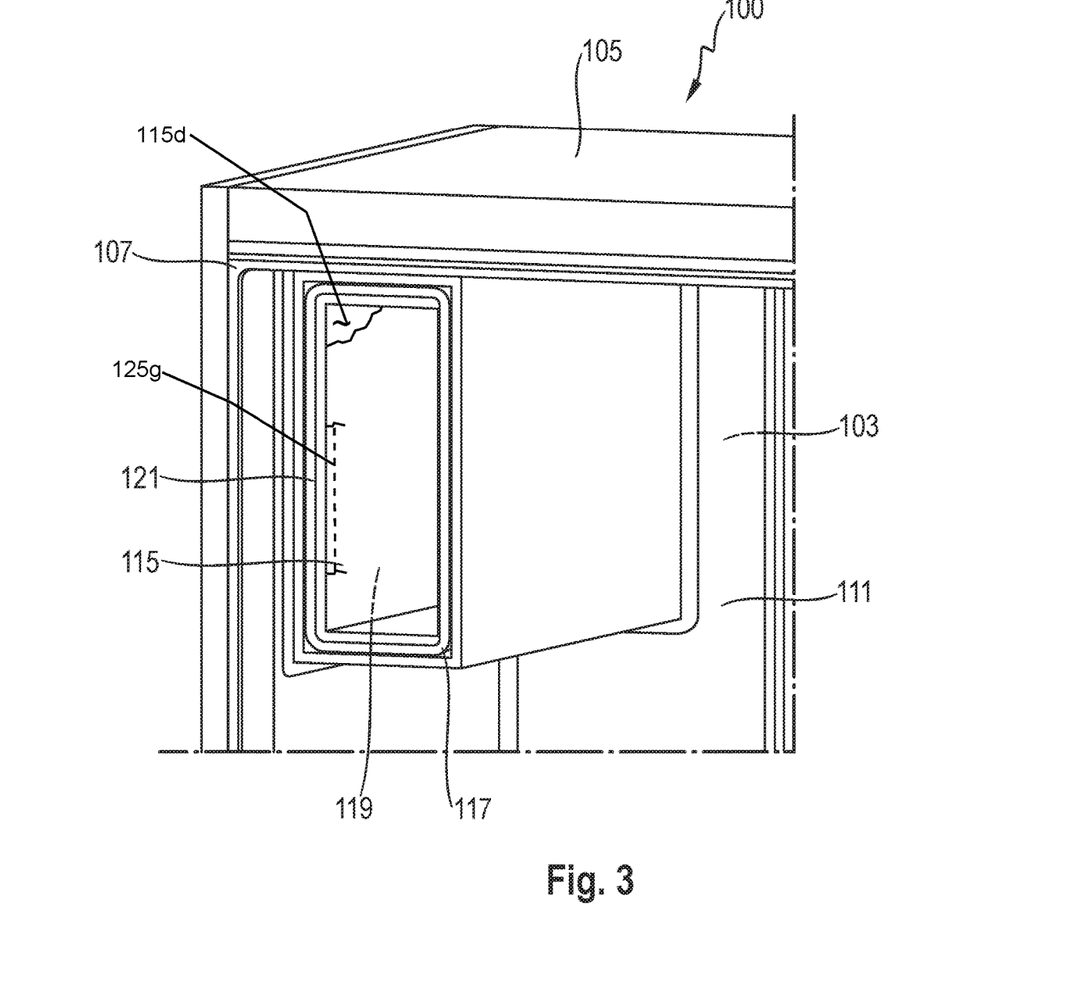
FIG. 3 shows a schematic representation of a refrigerator compartment container having an ice container.

FIG. 3 shows a schematic representation of a refrigerator compartment container having an ice container. In FIG. 3, the refrigerator compartment container 107 of a refrigeration appliance 100 is shown in a front view, wherein the outer casing 105 to the top of the outer casing 105 is not shown in FIG. 3. The refrigerator compartment 103 of the refrigeration appliance 100 is delimited by the interior 111 of the refrigerator compartment container 107. The exterior 109 of the refrigerator compartment container 107 and the receiving niche 113, which is arranged on the exterior 109, is not shown in FIG. 3.

The receiving niche 113 has an opening 117 to the refrigerator compartment 103. The opening 117 to the refrigerator compartment 103 and the opening 121 of the ice container 115 are aligned flush with one another, wherein a container interior 119 of the ice container 115 is accessible through the opening 121 of the ice container 115. The user of the refrigeration appliance 100 can thus access the container interior 119 of the ice container 115 from the refrigerator compartment 103, in order to take ice from the container interior 119 for instance.

Figures 4, 4A:
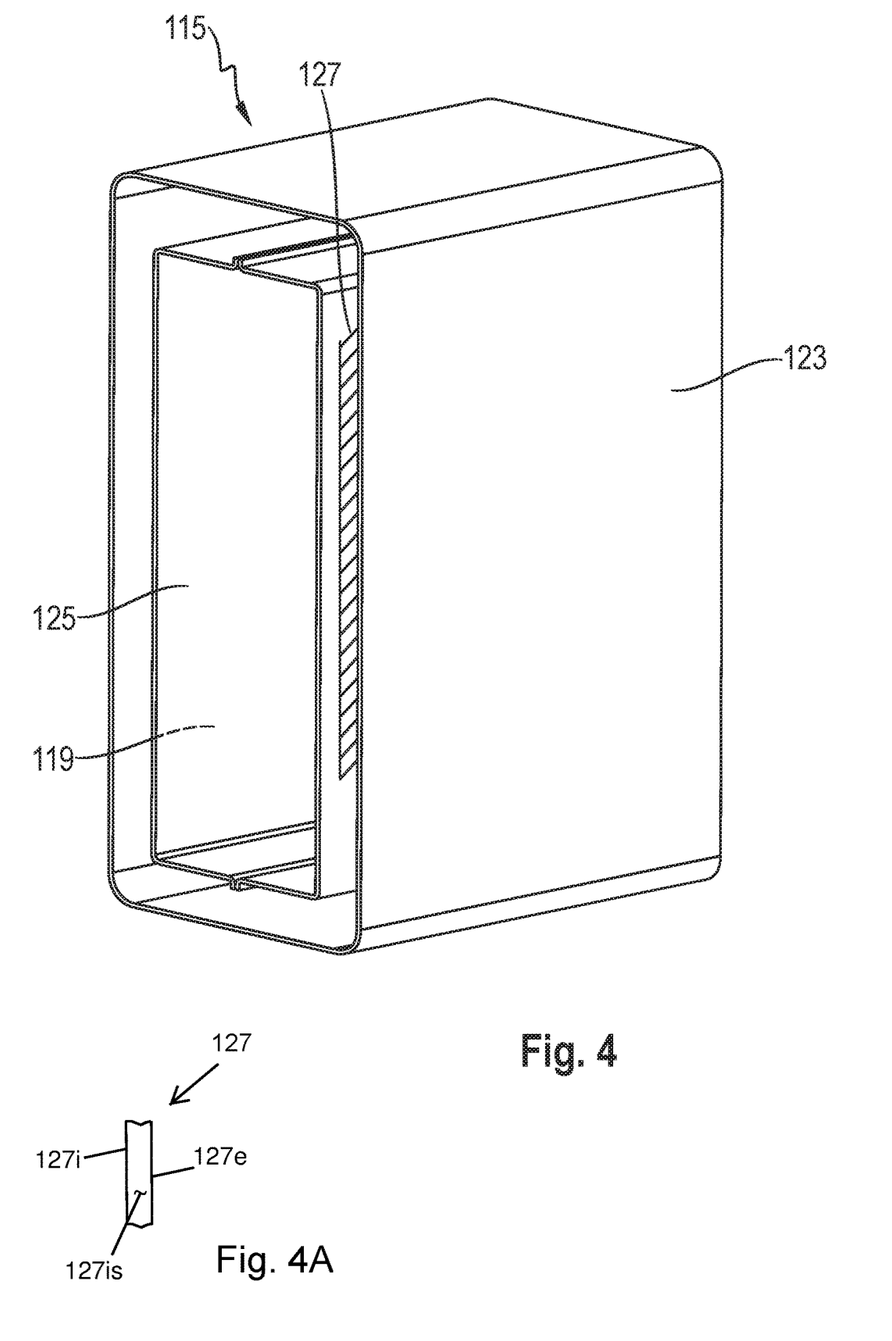
FIG. 4 shows a schematic representation of an ice container.
FIG. 4a shows an enlarged partial section of an insulation plate.

FIG. 4 shows a schematic representation of an ice container. The ice container 115 comprises a container outer wall 122 and a container inner wall 125, wherein the container inner wall 125 delimits the container interior 119 of the ice container 115. A thermal insulation 127 is arranged between the container outer wall 123 and the container inner wall 125. The thermal insulation 127 can comprise a thermal insulation plate or a thermal insulation layer, and is embodied to ensure an effective thermal insulation between the container interior 119 and the outer area of the ice container 115. FIG. 4A shows a partial section view of a thermal insulation plate 127 having a plate interior 127i and a plate exterior 127e delimiting and plate in space 127 is that contains vacuum, air, or insulation gas. The ice container 115 has a container cover 115d that can be embodied in particular as a container door 115d, by means of which the ice container can be closed. The container inner wall 125 is formed with a peripheral groove 125g (shown schematically by a dashed line) for receiving the container cover 115d.

On account of the inventive arrangement of the ice container 115 on the refrigerator compartment container 107 of the refrigeration appliance 100, a gap between the ice container 115 and the exterior 109 of the refrigerator compartment container 107 can be prevented by the tight connection between the ice container 115 and the refrigerator compartment container 107, as a result of which a particularly effective fastening of the ice container 115 to the exterior 109 of the refrigerator compartment container 107 is achieved.

As a result of the ice container 115 being arranged on the exterior 109 of the refrigerator compartment container 107, insulation of the ice container 115 by the insulation material of the refrigeration appliance 100 can be ensured in addition to the thermal insulation 127. Moreover, the arrangement of the ice container 115 on the exterior 109 of the refrigerator compartment container 107 enables a refrigerant evaporator to be mounted on the ice container 115 immediately before the refrigeration appliance 100 is filled with foam, or the air ducts which supply the ice container 115 with cooling energy can be effectively and advantageously attached.

All features explained and shown in conjunction with individual embodiments of the invention can be provided in a different combination in the inventive subject matter, in order at the same time to realize their advantageous effects.

The scope of protection of the present invention is provided by the claims and is not restricted by the features explained in the description or shown in the Figures.

LIST OF REFERENCE CHARACTERS

100 Refrigeration appliance
101 Refrigeration appliance door
103 Refrigerator compartment
105 Outer casing
107 Refrigerator compartment container
109 Exterior of the refrigerator compartment container
111 Interior of the refrigerator compartment container
113 Receiving niche
115 Ice container
117 Opening of the receiving niche to the refrigerator compartment
119 Container interior
121 Opening of the ice container
123 Container outer wall
125 Container inner wall
127 Thermal insulation

The invention claimed is:

1. A refrigeration appliance, comprising:
a refrigerator compartment container, said refrigerator compartment container delimiting a refrigerator compartment;
an ice container for providing ice, said ice container having a container outer wall, a container inner wall and a thermal insulation between said container inner wall and said container outer wall;
said refrigerator compartment container having a receiving niche defining a portion of an exterior of said refrigerator compartment container, said receiving niche for receiving said ice container therein, said receiving niche having an opening to said refrigerator compartment.

2. The refrigeration appliance according to claim 1, wherein said ice container is formed with an opening, and wherein said opening of said ice container and said opening of said receiving niche are aligned flush with one another.

3. The refrigeration appliance according to claim 1, wherein said thermal insulation comprises a thermal insulation plate or a thermal insulation fibrous layer.

4. The refrigeration appliance according to claim 1, wherein said thermal insulation comprises a thermal insulation plate with a plate exterior and a plate interior, which delimit a plate intermediate space, and wherein said plate intermediate space contains vacuum, air or insulation gas.

5. The refrigeration appliance according to claim 1, wherein said receiving niche is a deformation of said exterior of said refrigerator compartment container.

6. The refrigeration appliance according to claim 1, which further comprises a refrigeration appliance door on a front side thereof, and wherein said opening of said receiving niche points toward said refrigerator compartment and toward said refrigeration appliance door.

7. The refrigeration appliance according to claim 1, wherein said ice container has a container cover configured to close said opening of said ice container.

8. The refrigeration appliance according to claim 7, wherein said container cover is a container door.

9. The refrigeration appliance according to claim 7, wherein said container inner wall is formed with a peripheral groove for receiving said container cover.

10. The refrigeration appliance according to claim 1, wherein said ice container is bonded to said receiving niche.

11. The refrigeration appliance according to claim 1, wherein said ice container is connected to said receiving niche by way of a force-fitting connection or a form-fitting connection.

12. The refrigeration appliance according to claim 1, which comprises an outer casing delimiting a housing intermediate space between said outer casing and said refrigerator compartment container, wherein the housing intermediate space contains an insulation material.

13. The refrigeration appliance according to claim 12, wherein said insulation material in said housing intermediate space is polyurethane foam.

14. The refrigeration appliance according to claim 1, which comprises a housing seal disposed at said opening to said refrigerator compartment in order to seal said opening to said refrigerator compartment relative to said refrigerator compartment.

15. A refrigeration appliance, comprising:
- a refrigerator compartment container, said refrigerator compartment container delimiting a refrigerator compartment;
- an ice container for providing ice, said ice container having a container outer wall, a container inner wall and a thermal insulation between said container inner wall and said container outer wall;

said refrigerator compartment container having an exterior formed with a receiving niche for receiving therein said ice container, said receiving niche being arranged laterally on said exterior of said refrigerator compartment container said receiving niche having an opening to said refrigerator compartment.

* * * * *